United States Patent
Leimbach et al.

(10) Patent No.: US 11,994,954 B2
(45) Date of Patent: May 28, 2024

(54) FAST DISASTER RECOVER FROM BACKUP STORAGE USING SMART LINKS

(71) Applicant: Dell Products, L.P., Round Rock, TX (US)

(72) Inventors: David Leimbach, Mechanicsburg, PA (US); Michael Frank, Issaquah, WA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/871,587

(22) Filed: Jul. 22, 2022

(65) Prior Publication Data

US 2024/0028480 A1  Jan. 25, 2024

(51) Int. Cl.
*G06F 11/14* (2006.01)
(52) U.S. Cl.
CPC ...... *G06F 11/1469* (2013.01); *G06F 2201/84* (2013.01)
(58) Field of Classification Search
CPC .................................................. G06F 11/1461
USPC ........................................................ 707/643
See application file for complete search history.

(56) References Cited

U.S. PATENT DOCUMENTS

2017/0318111 A1\* 11/2017 Dornemann ........ H04L 41/0856
2018/0060176 A1\* 3/2018 Thakkar .............. G06F 9/45558

\* cited by examiner

*Primary Examiner* — Hung T Vy
(74) *Attorney, Agent, or Firm* — Amin, Turocy & Watson, LLP

(57) ABSTRACT

Actual files, which may comprise objects, are stored from a high-performance cluster storage of a first system to a lower performance storage of a remote second computing system as a backup. A set of proxy files, which point to locations of the actual files within the backup, is created that may be stored to a cluster storage system, or to the lower performance storage, at the remote second computing system. A user, or application, of the first system may access an actual file from the backup that is pointed to in a corresponding proxy file. The actual file accessed from the backup may be stored to a new location at a cluster storage to facilitate future access requests made before the actual file is restored from the backup to the first system. The proxy file corresponding to the accessed file may point to the new location of the retrieved file.

20 Claims, 10 Drawing Sheets

| FILENAME | CONTENTS | |
|---|---|---|
| FILE 1 | PORTION OF FILE 1 | INFORMATION POINTING TO FILE 1 |
| FILE 2 | PORTION OF FILE 2 | INFORMATION POINTING TO FILE 2 |
| FILE 3 | PORTION OF FILE 3 | INFORMATION POINTING TO FILE 3 |
| ... | ... | ... |
| FILE n | PORTION OF FILE n | INFORMATION POINTING TO FILE n |

PROXY FILES

FIG. 4

FAST DISASTER RECOVER FROM BACKUP STORAGE USING SMART LINKS

BACKGROUND

A cloud computing service provider may make various computing resources, for example, software as a service, virtual machines, storage, bare metal computing hardware, or even a complete enterprise's infrastructure and development platforms, available over a communication network. A cloud services provider may make a public cloud computing resource available to users over a publicly accessible network, such as the Internet. A private cloud computing resource is typically available or accessible only by a given customer, such as an enterprise and its employees. Computing resources may be provided from an enterprise's own on-premises data center or from a data center operated by an independent (e.g., independent from the enterprise customer) cloud services provider. A hybrid cloud may connect an organization's private cloud services and resources of public clouds into an infrastructure that facilitates the organization's applications and workloads in a manner that balances the maximizing of performance and the minimizing of costs.

Cloud providers, whether public or private, may use clustering of servers. A server cluster typically comprises servers that share a single Internet Protocol ("IP") address. Clustering enhances data protection typically, availability, load balancing, and scalability. A server associated with a cluster may be referred to as a node, which may comprise a hard drive, random access memory, ("RAM"), and central processing unit ("CPU") resources. If a server within the cluster fails, another server can automatically, or semiautomatically, take over for the failed server, thus reducing downtime and outages experienced by users and providing uninterrupted, or minimal interruption, of access to server related resources.

In a cloud environment it is desirable to have failover capabilities with performance specifications such that if a cloud computing resource fails during an event, such as, for example, a power outage, break in a communication link, or even a failed component, which may be due to a weather event or a seismic event, failover is practically seamless from the perspective of a user of the resource with the user noticing minimal, if any, disruption of his, or her, use of the resource. Failover resources are typically used when an event disables an active primary resource and are typically idle when the primary resource is active and providing service to a user. Cloud resources have a cost associated with them, even when idle. Therefore, it is desirable to facilitate failover capabilities having costs lower than for fully redundant cluster resources but still having acceptable performance (e.g., exceeds performance attainable using typical backup restoration techniques) with minimal disruption.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method, comprises receiving, by a system comprising a processor, one or more files from a cluster first storage. The first storage may comprise a storage of a cluster computing system that is operated by, or for, an organization such as an enterprise. The cluster storage may be a primary storage to and from which users of the enterprise store and retrieve data and information on a regular basis (e.g., for daily use or for operation of the enterprise). The primary, or main, storage may be referred to as the first storage. The method may comprise storing the one or more files to a tiered second storage as a backup. The tiered second storage may be referred to as a second-tier storage. The tiered second storage may comprise a storage that is part of a computing system that is remote from the system comprising the processor that comprises the cluster first storage, and may comprise storage on one or more tiers, wherein one tier may comprise higher performance than another (e.g., higher performance may correspond to faster reading and writing of files and information blocks from and to one tier as compared to another). For example, one tier may comprise solid state drive, another tier may comprise a hard disc drive, and yet another tier may comprise a tape drive. The solid-state tier would likely provide faster reading and writing from and to it, the disc drive tier a little slower than the solid-state drive, and the tape drive tier even slower performance than the disc drive. The tiered storage may comprise storage components hosted by a cloud services provider at a location remote from the cluster system associated with the organization.

The embodiment method may comprise generating one or more proxy files that correspond to the one or more files of the backup. The proxy files may be files that contain meta data that relate to corresponding files of the backup. The proxy files may comprise portions of respective files that the proxy files correspond to. In an example embodiment, a proxy file may comprise 8 KiloBytes ("KB") of a file that it corresponds to with the remainder of the file that it corresponds to having been truncated in the proxy file. A proxy file may be a file that contains information, such as an address or a location on a drive, that corresponds to a location of a file of the backup that the proxy file corresponds to. The proxy files may be files that contains information, such as a link, that points to an address or a location on a drive where a file that the proxy file corresponds to is stored. Accordingly, a proxy file may contain information about a file, and about the location of a file, that is stored on the tiered second storage as part of a backup of files from the cluster first storage.

The embodiment method may comprise receiving a first file-access request for a file of the one or more files of the backup; retrieving the file requested in the first file-access request from the tiered second storage; and providing the file requested in the first file-access request in response to the first file-access request. The retrieving of the file requested in the first file-access request from the tiered second storage may comprise the first file-access request being processed by a component of the computing system of which the tiered second storage is a part such that a proxy link corresponding to a file requested in the first file-access request is used to determine a location on the tiered second storage from which to retrieve the requested file. The providing of the file in response to the first file-access request may occur during a re-storing of the one or more files of the backup to a cluster storage, which may be the cluster first storage, or which may be a different cluster storage, for example a cluster storage that is part of the computing system of which the tiered second storage may be a part.

In an embodiment, the one or more files of the backup may be received at the tiered second storage in a batch. Proxy files, or proxy links, links may facilitate locating a particular file after the batch of files has been stored to the tiered second storage. In an embodiment the one or more proxy files comprise information corresponding to locations where the one or more files of the backup are stored.

The example embodiment may further comprise copying the file, or files, requested in the first file-access request to a cluster third storage and providing the file requested in the first file-access request from the cluster third storage in response to a second file-access request that requests the file requested in the first file-access request. The cluster third storage may comprise a storage component at the computing system that comprises the tiered second storage, the system that comprises the cluster first storage, or a different system that does not comprise the cluster first storage or the tiered second storage.

The example embodiment may further comprise storing the one or more proxy files that correspond to the one or more files of the backup to the tiered second storage. In an embodiment, the one or more proxy files may be stored on a standby storage. This storage on a standby storage may be a storage that is different from the tiered second storage. In an embodiment, the proxy files may be stored in a storage of a different computing system than the system that comprises the cluster first storage from which the files, to which the proxy files correspond, were backed up by the backup.

In an embodiment, the one or more proxy files are generated as the one or more files are received from the high-performance first storage. This may facilitate faster retrieval of the one or more files from the files stored as a backup that might not otherwise be individually retrievable unless the batch of files in the backup were restored to the cluster storage from which they originated. In other words, as files of a batch are received, a location on the tiered second store of the file stored in the backup may be generated and stored as, or as part of, a proxy file.

BRIEF DESCRIPTION OF THE DRAWINGS

FIG. 4 illustrates an example set of proxy files.

DETAILED DESCRIPTION OF THE DRAWINGS

Figure 1:
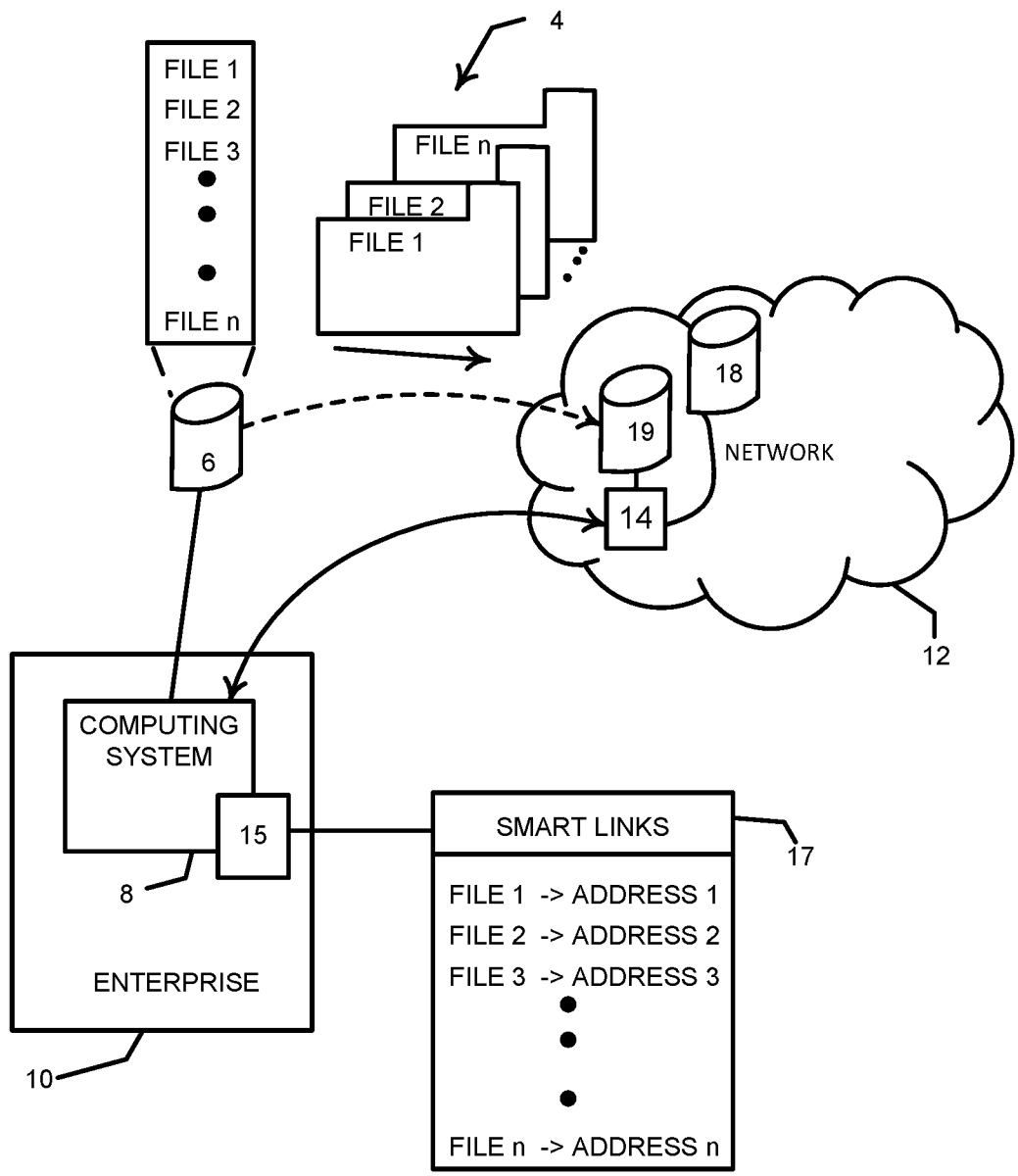
FIG. 1 illustrates an exemplary system to use proxy files to access files from a backup in a cloud storage.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is only illustrative and exemplary of one or more concepts expressed by the various embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Turning now to the figures, FIG. 1 illustrates a system 2 that may back up files 4 that are currently stored on a first storage 6, which may comprise a cluster storage that is part of a computing system 8 that may be operated by, or for, an enterprise 10. Computing system 8 may be operated at a data center on the premises of enterprise 10 or may be operated at a data center that is geographically remote from the premises of enterprise 10 but may nevertheless be operated exclusively for the use of enterprise 10 and users the enterprise authorizes to use system 8 (e.g., employees of enterprise 10 may be authorized to used computing system 8). Files 4 may be backed up to components of remote computing system 14 via communication network 12, such as, for example, the Internet. System 8 may transfer files 4 as a batch of files during a backup procedure to computing system 14, which may comprise cluster storage as well as slower, second-tier storage such as tape drives. Storage components may be organized as tiered storage such that a high-performance storage such as a first tier storage 18 that may comprise a solid state drive or disc drive may be used for regular, routine access by users of the storage whereas a second tier of storage 19 may comprise a slower tape drive that may be used for storing backups as well as infrequently accessed files that are not routinely accessed. In addition, files of a batch backup may not typically be individually accessible from the backup since they were stored as a batch backup, which may be an image, or similar, that may typically be addressable, or accessible, as a large file instead of as individual files.

During backup of files 4, backup module 15, which may comprise software, hardware, firmware, an application program interface ("API"), and the like may generate, manage the generation of, control the generation of, or otherwise be involved with the generation of a proxy file corresponding to a file of files 4 as the file is being processed for backup, or during a period that is temporally related to the creation of the backup, such that a set of proxy files 17 is created that corresponds to files 4 that are being backed up. Proxy files 17 may contain information that points to the files backed up to second-tier storage 19 at system 14; such information may comprise addresses or locations on a drive, such as a sectors on a hard disc or locations on a tape.

Figure 2:
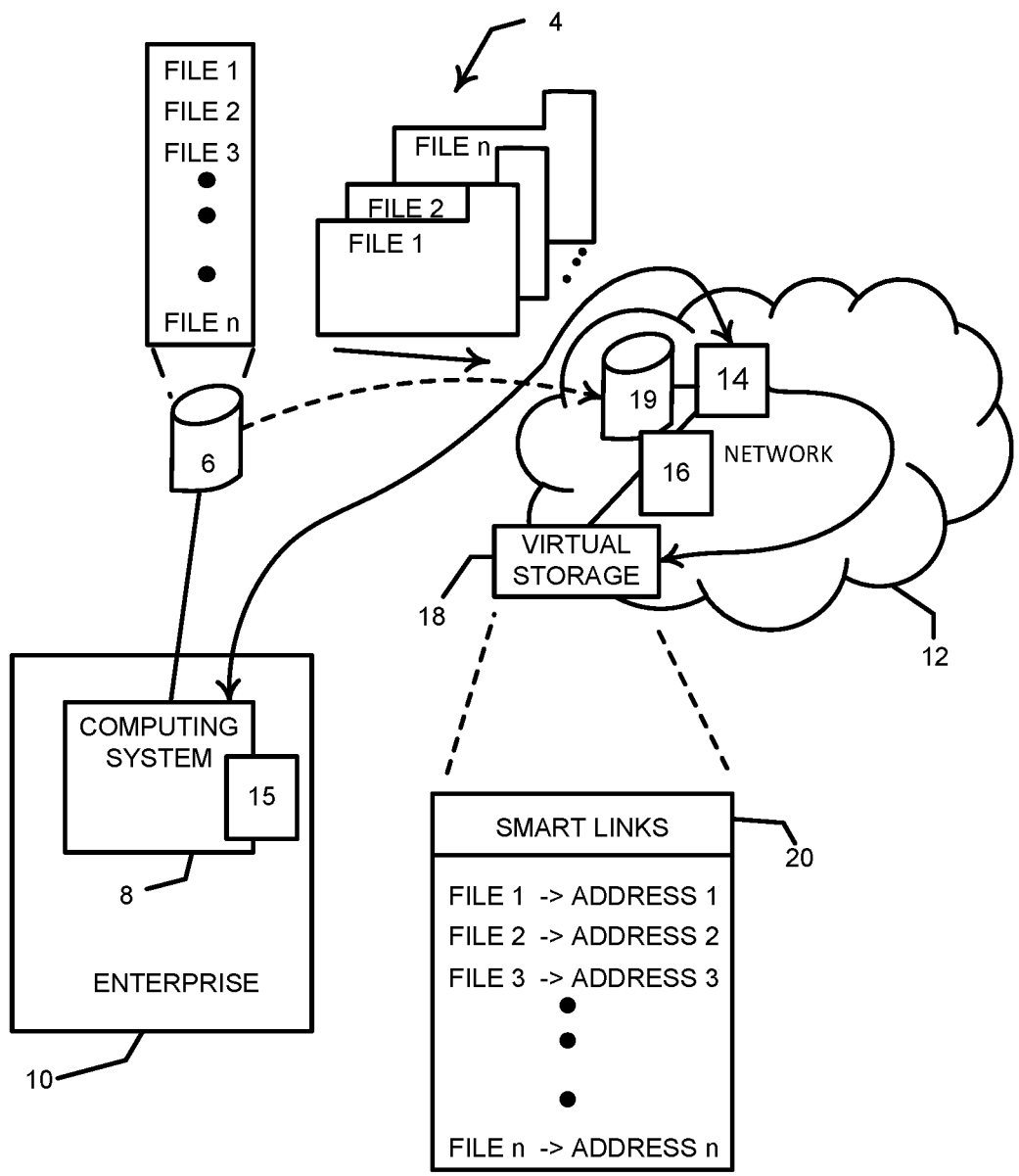
FIG. 2 illustrates an exemplary system to use proxy files stored in a cloud storage to access files from a backup in a cloud storage.

Turning now to FIG. 2, the figure shows system 2, as shown in FIG. 2, that has been modified such that a computing module 16 causes a storage of computing system 14 to store proxy files 20. Proxy files 20 may be the same proxy files 17 stored at computing system 8 as shown in FIG. 1. Computing module 16 shown in FIG. 2 may comprise software, hardware, firmware, an application program interface ("API"), and the like and may generate, manage the generation of, control the generation of, or otherwise be involved with the generation of a proxy file corresponding to a file of files 4 as the file is being processed for backup such that a set of proxy files 17 is created that correspond to files 4 that are being backed up. In an embodiment, proxy files set 20 may be a copy of proxy files 17 generated during a backup of files 4 as shown in FIG. 1. The set of proxy files 20 may be stored in a first-tier storage 18, such as a cluster storage of computing system 14. In an embodiment, proxy files 20 may be stored on a standby storage (which may be a cluster storage), or second-tier storage 19.

If a disaster, such as a weather event or seismic event, for examples, causes loss or inaccessibility of one of files 4 stored in storage 6 by a user of computing system 8 (e.g., if storage 6 is not on-site at the premises of enterprise 10) the user, or an application running on computing system 8, may nevertheless retrieve one or more files of files 4 stored as a backup at second tier storage 19 of computing 14 using one or more of proxy files 20. Furthermore, the retrieval of the one or more files 4 from the backup may appear to be seamless to the user since a portion of a proxy file corresponding to the actual file, or files, being requested may contain a truncated portion of the actual file, or files, being requested. Although second-tier storage 19 of computing system 14 on which the backup of files 4 may be stored may provide slow access to the file due to the nature or type of storage device the backup is stored on, a user of computing system 8 may begin viewing, or working on, the portion of the file, or files, being requested by using the portion of the requested file, or files, that the corresponding proxy files may contain, while information in the proxy file that points to the actual file, or files, stored in the backup, is accessed from the backup that is stored at the second-tier storage.

Storage 18 may comprise cluster storage, such as one or more solid-state drives or hard disc drives. Storage 18 may comprise a single node standby cluster designated specifically for storing proxy files 20. Storage 18 may comprise a cluster storage that is designated to store proxy files 20 in addition to other files and data. In an embodiment, second-tier storage 19 may comprise storage 18. When proxy files 20 are stored to storage 18, the files 4 that may be pointed to by information in the corresponding proxy file may appear to a user, or application, of computing system 8 as being stored at storage 18 when in fact the actual, complete file is stored as a backup of the file, or files, being requested on second-tier storage 19.

It will be appreciated that a user of computing system 14 may not need to know that he, or she, is using a proxy file. When proxy files 20 are created during, or in connection with, a backup process, an operating system of computing system 8 may be programmed such that in the event of a loss of access to files 4 from storage 6, the user, and applications that the user uses, operate as they normally do and request file access from storage 6. When such a file request is made the operating system of computing system 6 may be programmed to automatically seek a requested file from the set of proxy files 20, which may appear as a virtual storage of files 4 from the perspective of computing system 8, or a user thereof. Thus, in a disaster recovery scenario where access to files stored at storage 6 is unavailable, the use of proxy files 20 with information pointing to an actual file, or files, stored in a backup in second-tier storage 19 may facilitate seamless recovery and use of the file, or files, without having to restore the complete backup of files from second tier storage 19.

Figure 3:
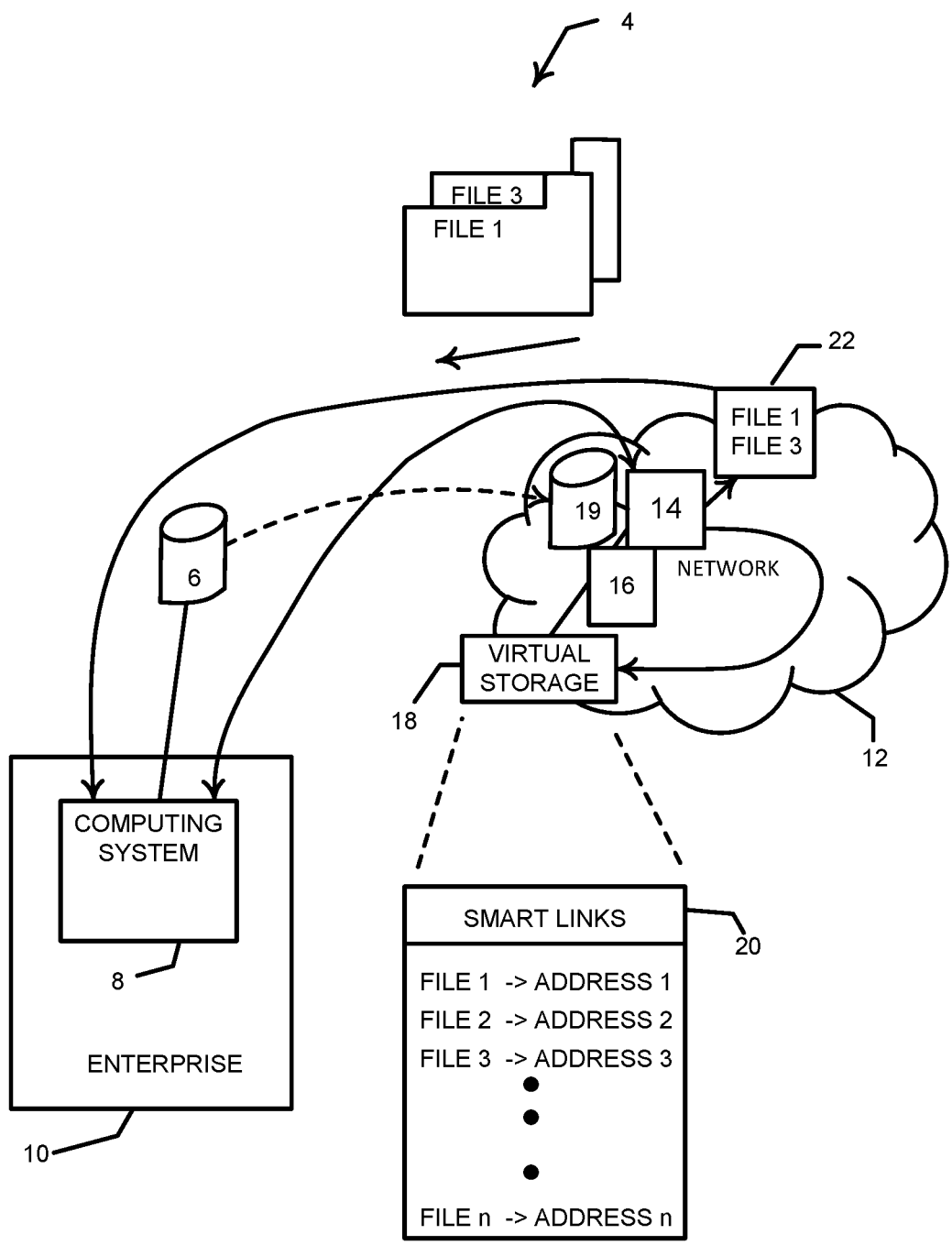
FIG. 3 illustrates an exemplary system to use proxy files stored in a cloud storage to access files from a cluster storage that were restored from a backup in a cloud storage.

Turning now to FIG. 3, the figure illustrates a modification to system 2 wherein a cluster storage 22 is used to store one or more files that a user of system 8 has requested. After a request has been made for one or more files, for examples File 1 and File 3 of files 4 that were backed up to second tier storage 19 as shown in FIGS. 1 and 2, computing system 14 may retrieve File 1 and File 3 from second-tier storage 19 and provide the files to the user, or application, making the request as described above. In addition, module 16 may cause computing system 14 to copy files retrieved from a backup stored on second tier storage 19 to storage 22, which may be accessible from system 8. In an embodiment, proxy files 20 may provide access to files in storage 22 by a user or application of system 8. In an embodiment, storage 22 may comprise fast cluster storage, such as solid-state drives or hard discs as described above. Thus, after an initial request for File 1 and File 3 has been made and the files provided to system 8 from second-tier storage 19, future requests for File 1 or File 3 may be served from storage 22 instead of from the second-tier storage.

Turning now to FIG. 4, the figure illustrates an example data structure 23 of proxy files 20 (data structure 23 may be referred to as structure 20 since it contains proxy files 20). Data structure 23 may comprise a filename field 24 and a contents field 26 that contains information that corresponds to a given filename in filename field 24. Contents field 26 may comprise a file portion 28 that contains data of the file referred to by its corresponding file name 24. Data in file portion 28 may be, for example, a determined portion of the file corresponding the file name, such as 8 KB, and may also include pointing information 30 that points to a location of the corresponding file. For example, pointing information 30 may comprise an address associated with a location where the corresponding files stored on second-tier storage 19 as shown in reference to previous figures. Pointing information 30 may comprise a location on a tape to which the corresponding file has been stored as part of a backup process. Pointing information may comprise links to an IP address where the corresponding file is stored on a storage. It will be appreciated that information stored in contents field 26 may be separated by a comma, a semicolon, or other format. The format order of filename field 24 preceding contents portion 26 is also given for purposes of illustration. Other formats may be used so that data structure 23 comports with format requirements of storage 18 shown in previous figures.

Figure 5:
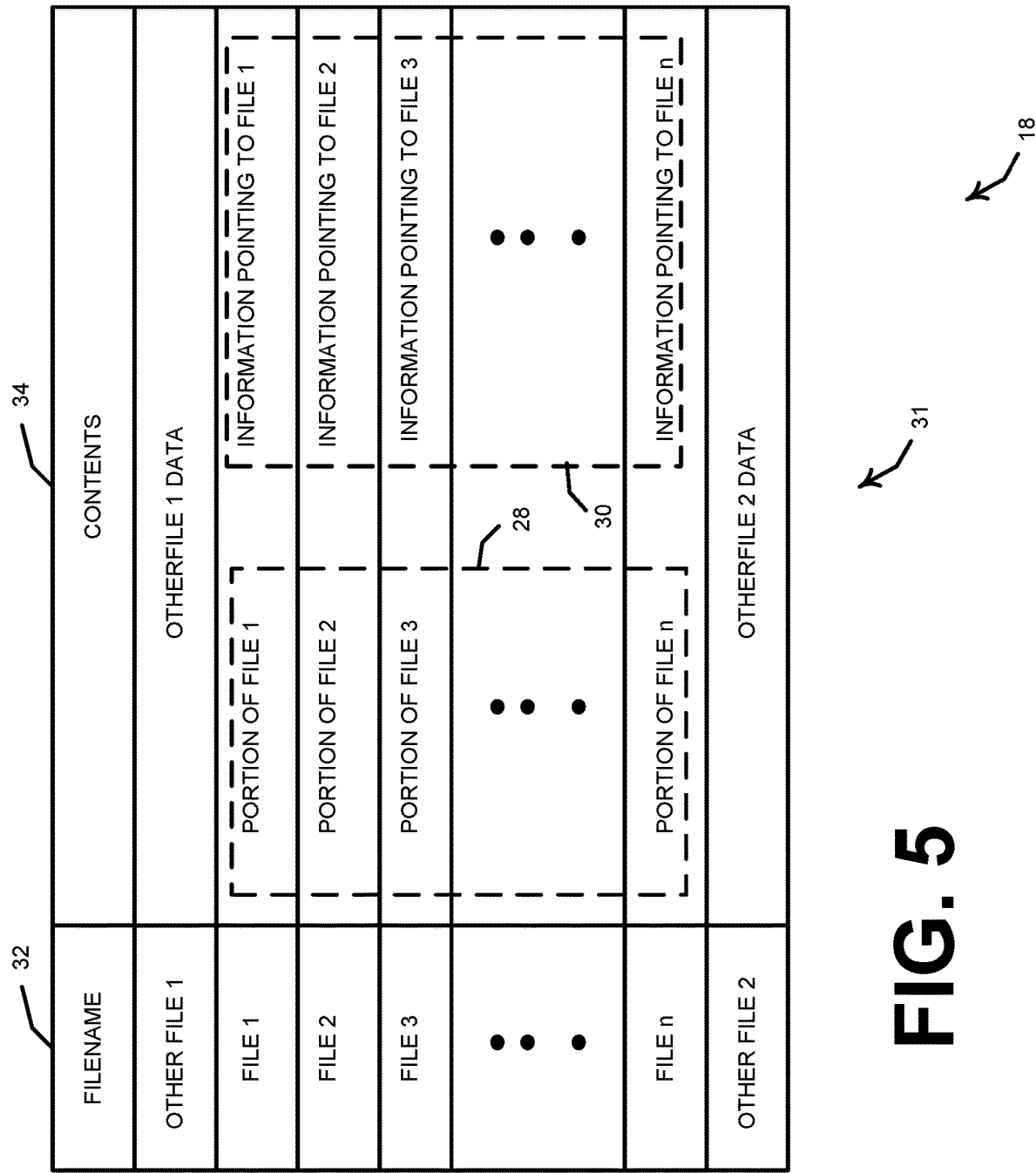
FIG. 5 illustrates an example data structure that contains proxy files and other files.

Turning now to FIG. 5, the figure illustrates a data structure 31 that may contain data structure 23, as described in reference to FIG. 4, stored in filename field 32 and contents field 34. For example, if proxy files 20 are stored to a storage cluster 18 with other files that are not proxy files that point to files stored in a backup at a different storage, contents field 34 may contain actual file data for files other than proxy files, but the contents field of structure 31 may be split into a file data portion 28 as described in reference to FIG. 4, and a pointing information portion 30, also as described in reference to FIG. 4. Thus, proxy files may be stored with other files on storage 18. It will be appreciated that structure 31, and fields 28 and 30 within contents field 34, as well as the order thereof, are given for purposes of illustration and are not meant to suggest that other formats or ordering of data could not be used instead within structure 31.

Figure 6:
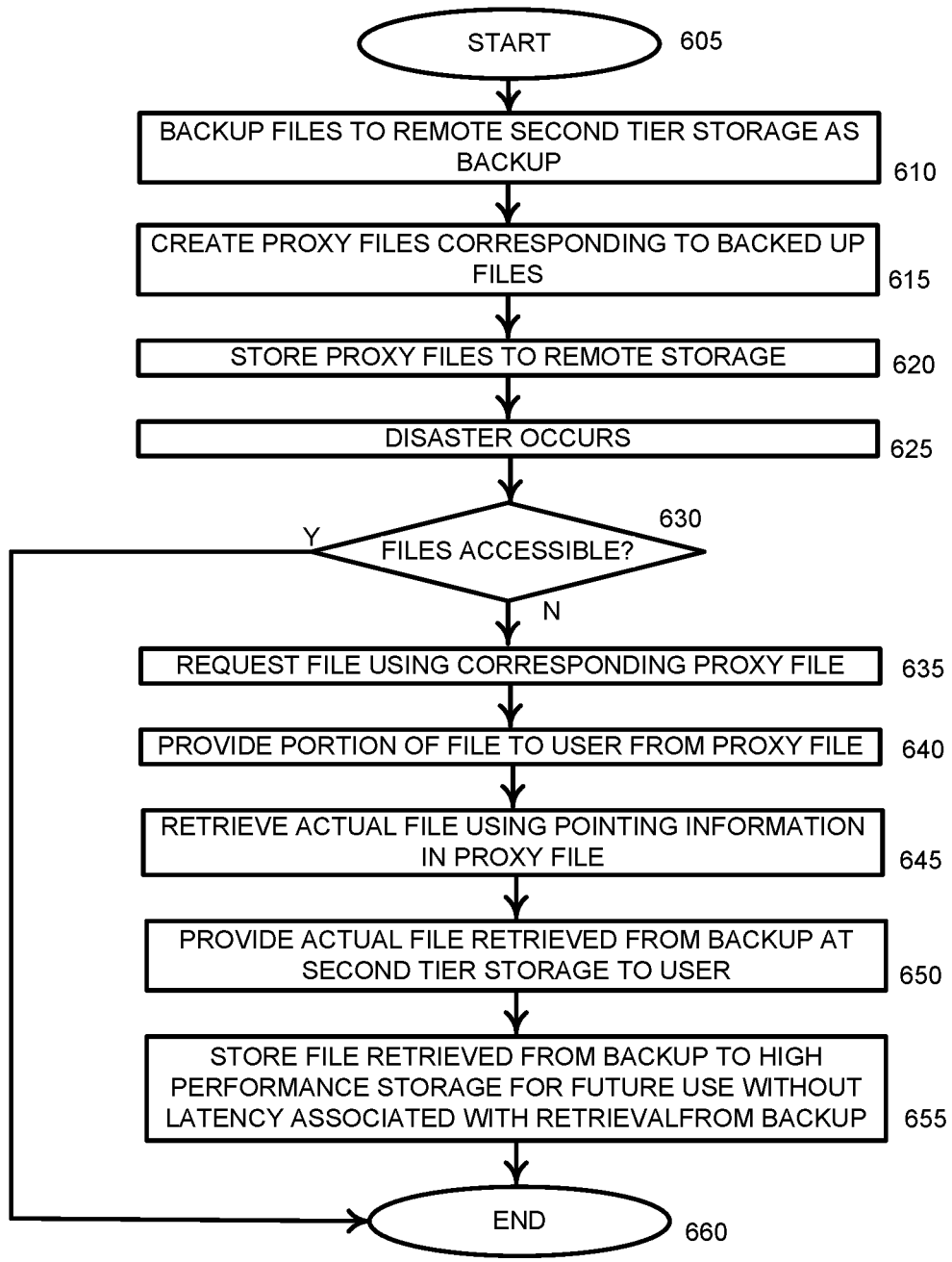
FIG. 6 illustrates a flow diagram of an example method to recover files from a backup after a disaster.

Turning now to FIG. 6, the figure illustrates a flow diagram of steps of a method 600 for accessing files from a backup that is stored on a second-tier storage using proxy files. Method 600 begins at step 605. At step 610 files that are stored at a main storage such as storage 6 of computing system 8 as shown in FIG. 3 may be backed up to a remote storage, such as a storage coupled with computing system 14 as shown in FIG. 3. The remote storage may comprise a second-tier storage, such as a tape drive, that may be slower, or offer lower performance, than the main storage, yet is nevertheless adequate for backup purposes.

At step 615 a proxy file that corresponds to a file being backed up from the main storage is created. A module at the remote storage, or at the remote computing system of which the remote storage is a part, may create the proxy file, or a module at the main storage/system from which the file is being backed up may create the proxy file. If multiple files are being backed up from the main system to the remote system a set of proxy files may be created. The proxy files may be stored at step 620 at a remote storage coupled with the remote computing system. The proxy files may be stored locally at a storage coupled with the main system. A proxy file may include pointing information that points to an address, a location, or that may provide other information to facilitate retrieval of the file to which the proxy file corresponds from the backup that was performed at step 610. A given proxy file may also include a portion of the file to which it corresponds, for example the portion may comprise 8 KB of the file to which the proxy file corresponds and points.

At step 625 a disaster may occur. Examples of a disaster may include a weather event, a seismic event, an explosion, a traffic accident that causes damage to a communication link that provides connectivity between an enterprises main computing system in an offsite high-performance storage, or other similar occurrence. At step 630 a determination may be made whether one or more files are accessible from main storage coupled with an enterprise's computing system. If the answer is yes, that the files are available or accessible from their normal location, method advances to step 660 and ends. If, however, a determination is made at step 630 that one or more files are not available or accessible from their normal location, method 600 advances to step 635. At step 635 a request for the one or more files may comprise processing a request for the one or more files from its/their normal location by accessing one or more of the proxy files that correspond to the one or more files being requested. An operating system of the enterprise's main computing system may automatically request the one or more files using the proxy file, or files, corresponding to the one or more files, which automatic process may be transparent to a user or application of the enterprise's main computing system seeking the requested file or files. At step 640 if a proxy file includes a portion of the actual file that the proxy file points to, the portion of the file may be provided to the user or application requesting the file while the actual file corresponding to the proxy file is retrieved from the backup on the second-tier storage.

At step 645 a module at the remote computing system may retrieve from the backup at the second-tier storage the file, or files, pointed to in the proxy file, or proxy files, corresponding to the file, or files, requested by the main computing system, such as system 8 shown in FIG. 3. At step 650 the actual file, or files retrieved at step 645 may be provided to a user, or an application that requested the file, or files, from the main computing system for use by the user or the application.

At step 655 the file, or files retrieved at step 645 may be stored to another storage, which may be at the site of the remote computing system, or which may be at the premises of the enterprise. The files stored at step 655 may be stored to a cluster storage, which may provide individual access to specific files, and which may generally provide a higher input/output performance than the second-tier storage that the backup made at step 610 is stored on. At step 660, if a user, or application, at the main computing system, such as computing system 8 shown in FIG. 3, wishes to use a file, or files, already requested at 635 and retrieved at step 645, the file or files may be provided to the user, or application, from the cluster storage to which the files were stored at step 655. Thus, after a file, or files have been retrieved from a backup using proxy files, even if files backed up at step 610 have not been restored to the main computing system yet, the files already retrieved at step 645 and stored to a cluster storage at step 655 may be accessed by a user, or application, of the main computing system with approximately the same performance as would be achievable from the file being stored on any cluster storage, which typically have lower access latency than a latency that would be associated with retrieving the same files again from the backup according to step 635 through step 650. Method ends at step 665.

Figure 7:
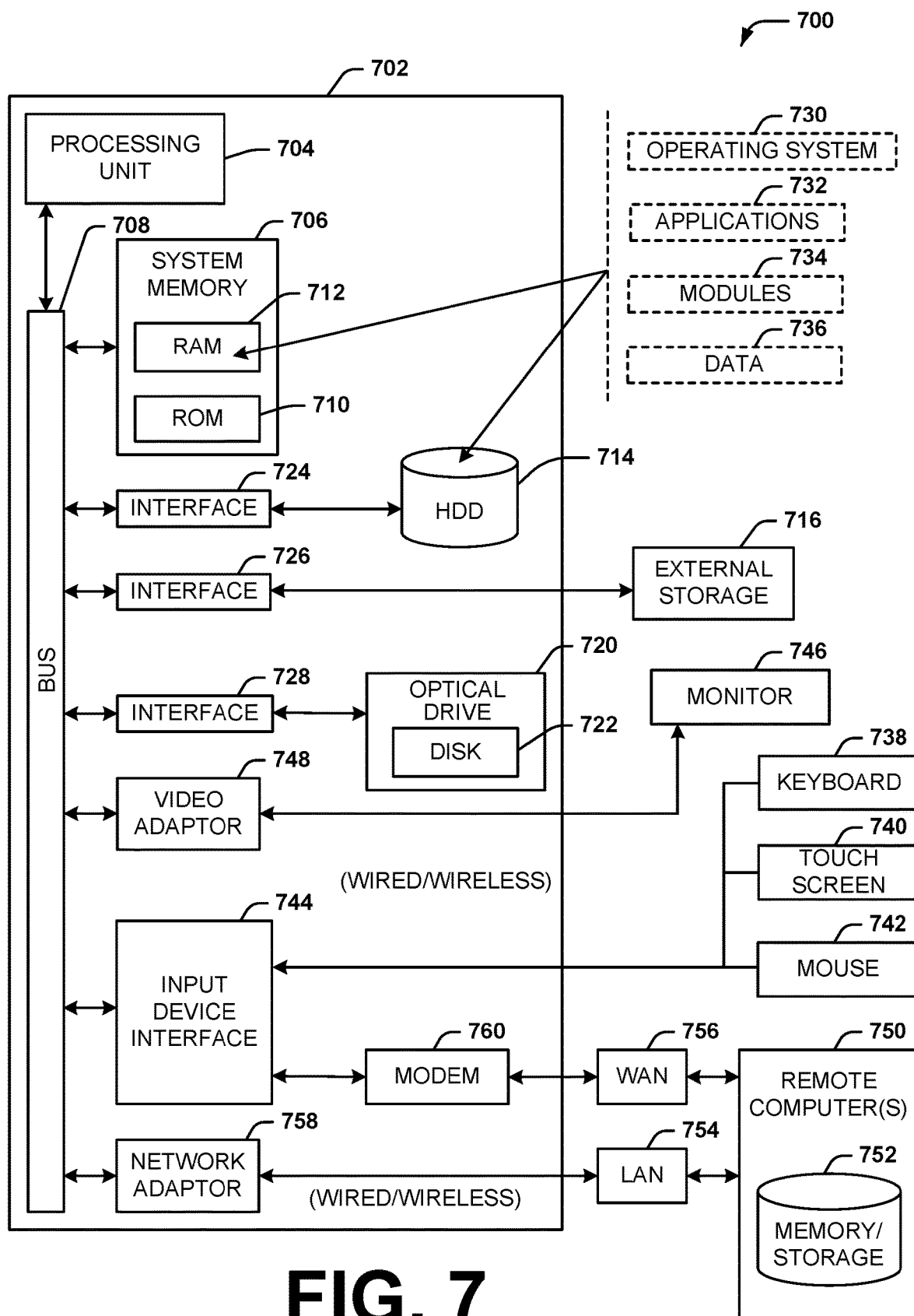
FIG. 7 illustrates a computer environment.

In order to provide additional context for various embodiments described herein, FIG. 7 and the following discussion are intended to provide a brief, general description of a suitable computing environment 700 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 7, the example environment 700 for implementing various embodiments of the aspects described herein includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors and may include a cache memory. Dual microprocessors and other multi-processor architectures can also be employed as the processing unit 704.

The system bus 708 can be any of several types of bus structure that can further interconnect to a memory bus (with or without a memory controller), a peripheral bus, and a local bus using any of a variety of commercially available bus architectures. The system memory 706 includes ROM 710 and RAM 712. A basic input/output system (BIOS) can be stored in a non-volatile memory such as ROM, erasable programmable read only memory (EPROM), EEPROM, which BIOS contains the basic routines that help to transfer information between elements within the computer 702, such as during startup. The RAM 612 can also include a high-speed RAM such as static RAM for caching data.

Computer 702 further includes an internal hard disk drive (HDD) 714 (e.g., EIDE, SATA), one or more external storage devices 716 (e.g., a magnetic floppy disk drive (FDD) 716, a memory stick or flash drive reader, a memory card reader, etc.) and an optical disk drive 720 (e.g., which can read or write from a CD-ROM disc, a DVD, a BD, etc.). While the internal HDD 714 is illustrated as located within the computer 702, the internal HDD 714 can also be configured for external use in a suitable chassis (not shown). Additionally, while not shown in environment 700, a solid-state drive (SSD) could be used in addition to, or in place of, an HDD 714. The HDD 714, external storage device(s) 716 and optical disk drive 720 can be connected to the system bus 708 by an HDD interface 724, an external storage interface 726 and an optical drive interface 728, respectively. The interface 724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 712, including an operating system 730, one or more application programs 732, other program modules 734 and program data 736. All or portions of the operating system, applications, modules, and/or data can also be cached in the RAM 712. The systems and methods described herein can be implemented utilizing various commercially available operating systems or combinations of operating systems.

Computer 702 can optionally comprise emulation technologies. For example, a hypervisor (not shown) or other intermediary can emulate a hardware environment for operating system 730, and the emulated hardware can optionally be different from the hardware illustrated in FIG. 7. In such an embodiment, operating system 730 can comprise one virtual machine (VM) of multiple VMs hosted at computer 702. Furthermore, operating system 730 can provide runtime environments, such as the Java runtime environment or the .NET framework, for applications 732. Runtime environments are consistent execution environments that allow applications 732 to run on any operating system that includes the runtime environment. Similarly, operating system 730 can support containers, and applications 732 can be in the form of containers, which are lightweight, standalone, executable packages of software that include, e.g., code, runtime, system tools, system libraries and settings for an application.

Further, computer 702 can comprise a security module, such as a trusted processing module (TPM). For instance, with a TPM, boot components hash next in time boot components, and wait for a match of results to secured values, before loading a next boot component. This process can take place at any layer in the code execution stack of computer 602, e.g., applied at the application execution level or at the operating system (OS) kernel level, thereby enabling security at any level of code execution.

A user can enter commands and information into the computer 702 through one or more wired/wireless input devices, e.g., a keyboard 738, a touch screen 740, and a pointing device, such as a mouse 742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 704 through an input device interface 744 that can be coupled to the system bus 708, but can be connected by other interfaces, such as a parallel port, an IEEE 1394 serial port, a game port, a USB port, an IR interface, a BLUETOOTH® interface, etc.

A monitor 746 or other type of display device can be also connected to the system bus 608 via an interface, such as a video adapter 748. In addition to the monitor 746, a computer typically includes other peripheral output devices (not shown), such as speakers, printers, etc.

The computer 702 can operate in a networked environment using logical connections via wired and/or wireless communications to one or more remote computers, such as a remote computer(s) 750. The remote computer(s) 750 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 752 is illustrated. The logical connections depicted include wired/wireless connectivity to a local area network (LAN) 754 and/or larger networks, e.g., a wide area network (WAN) 756. Such LAN and WAN networking environments are commonplace in offices and companies, and facilitate enterprise-wide computer networks, such as intranets, all of which can connect to a global communications network, e.g., the internet.

When used in a LAN networking environment, the computer 702 can be connected to the local network 754 through a wired and/or wireless communication network interface or adapter 758. The adapter 758 can facilitate wired or wireless communication to the LAN 754, which can also include a wireless access point (AP) disposed thereon for communicating with the adapter 758 in a wireless mode.

When used in a WAN networking environment, the computer 702 can include a modem 760 or can be connected to a communications server on the WAN 756 via other means for establishing communications over the WAN 756, such as by way of the internet. The modem 760, which can be internal or external and a wired or wireless device, can be connected to the system bus 708 via the input device interface 744. In a networked environment, program modules depicted relative to the computer 702 or portions thereof, can be stored in the remote memory/storage device 752. It will be appreciated that the network connections shown are example and other means of establishing a communications link between the computers can be used.

When used in either a LAN or WAN networking environment, the computer 702 can access cloud storage systems or other network-based storage systems in addition to, or in place of, external storage devices 716 as described above. Generally, a connection between the computer 702 and a cloud storage system can be established over a LAN 754 or WAN 756 e.g., by the adapter 758 or modem 760, respectively. Upon connecting the computer 702 to an associated cloud storage system, the external storage interface 726 can, with the aid of the adapter 758 and/or modem 760, manage storage provided by the cloud storage system as it would other types of external storage. For instance, the external storage interface 726 can be configured to provide access to cloud storage sources as if those sources were physically connected to the computer 702.

The computer 702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 8:
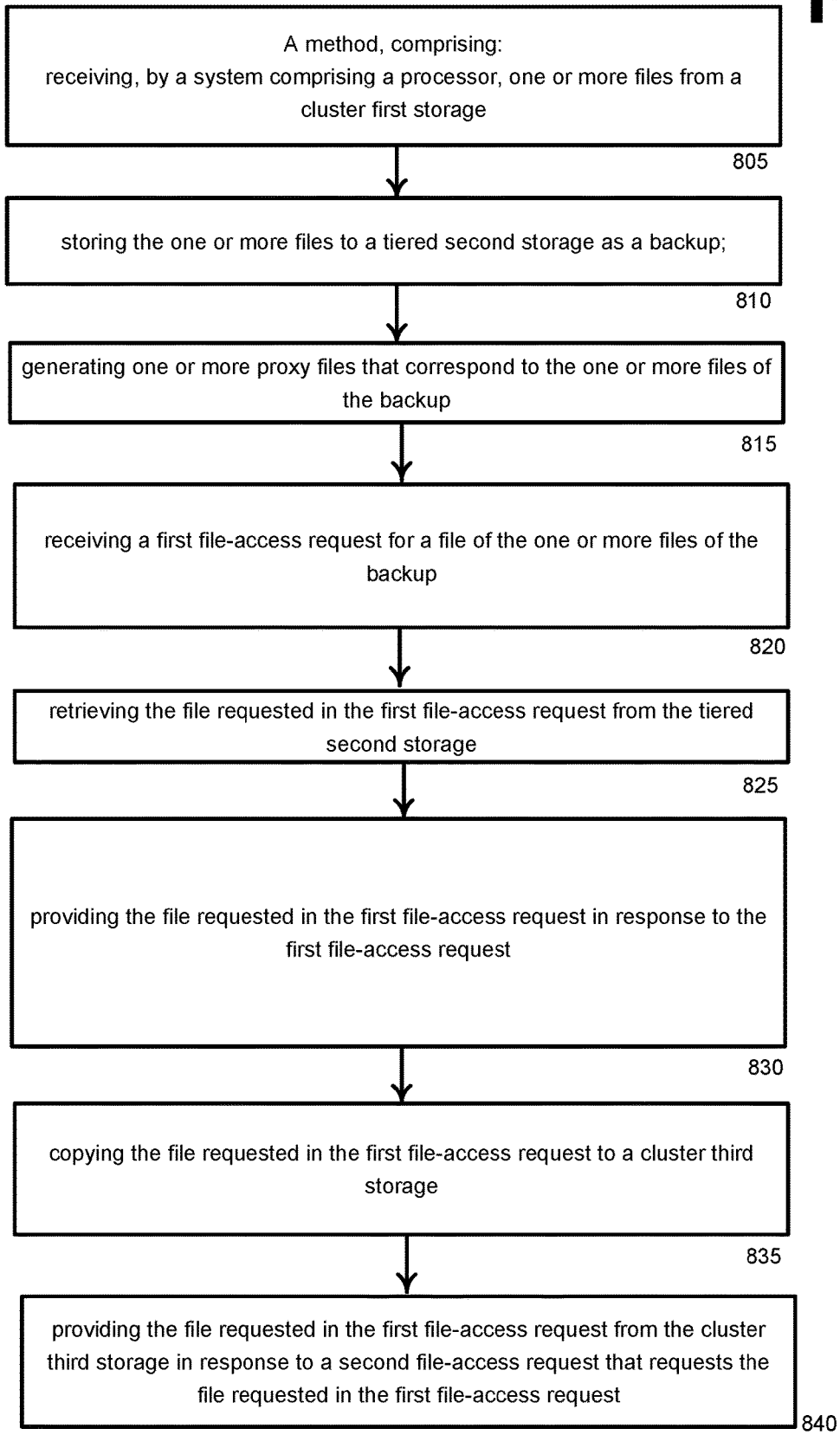
FIG. 8 illustrates a block diagram of an example method to recover files from a backup.

Turning now to FIG. 8, the figure illustrates an exemplary embodiment method 800 comprising at block 805 receiving, by a system comprising a processor, one or more files from a cluster first storage; at block 810 storing the one or more files to a tiered second storage as a backup; at block 815 generating one or more proxy files that correspond to the one or more files of the backup; at block 820 receiving a first file-access request for a file of the one or more files of the backup; at block 825 retrieving the file requested in the first file-access request from the tiered second storage; and at block 830 providing the file requested in the first file-access request in response to the first file-access request. Method 800 may also comprise at block 835 copying the file requested in the first file-access request to a cluster third storage, and at block 840 providing the file requested in the first file-access request from the cluster third storage in response to a second file-access request that requests the file requested in the first file-access request.

Figure 9:
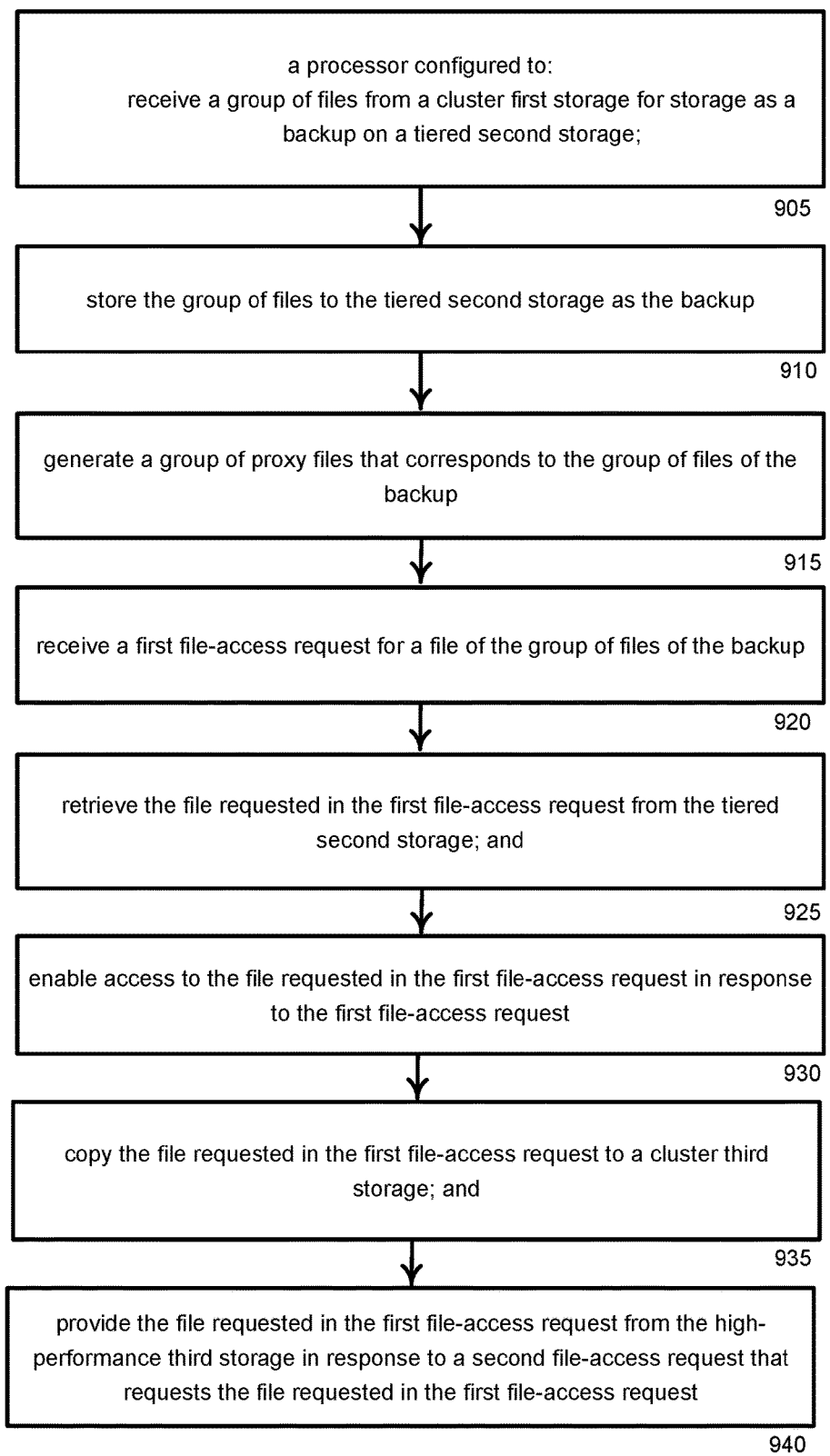
FIG. 9 illustrates a block diagram of an example system to recover files from a backup.

Turning now to FIG. 9, the figure illustrates an exemplary computing system embodiment 900, comprising a computing device, comprising a processor configured to at block 905 receive a group of files from a cluster first storage for storage as a backup on a tiered second storage; at block 910 store the group of files to the tiered second storage as the backup; at block 915 generate a group of proxy files that corresponds to the group of files of the backup; at block 920 receive a first file-access request for a file of the group of files of the backup; at block 925 retrieve the file requested in the first file-access request from the tiered second storage; and at block 930 enable access to the file requested in the first file-access request in response to the first file-access request. Method 900 the processor may be further configured to copy the file requested in the first file-access request to a cluster third storage at block 935, and ay block 940 provide the file requested in the first file-access request from the high-performance third storage in response to a second file-access request that requests the file requested in the first file-access request.

Figure 10:
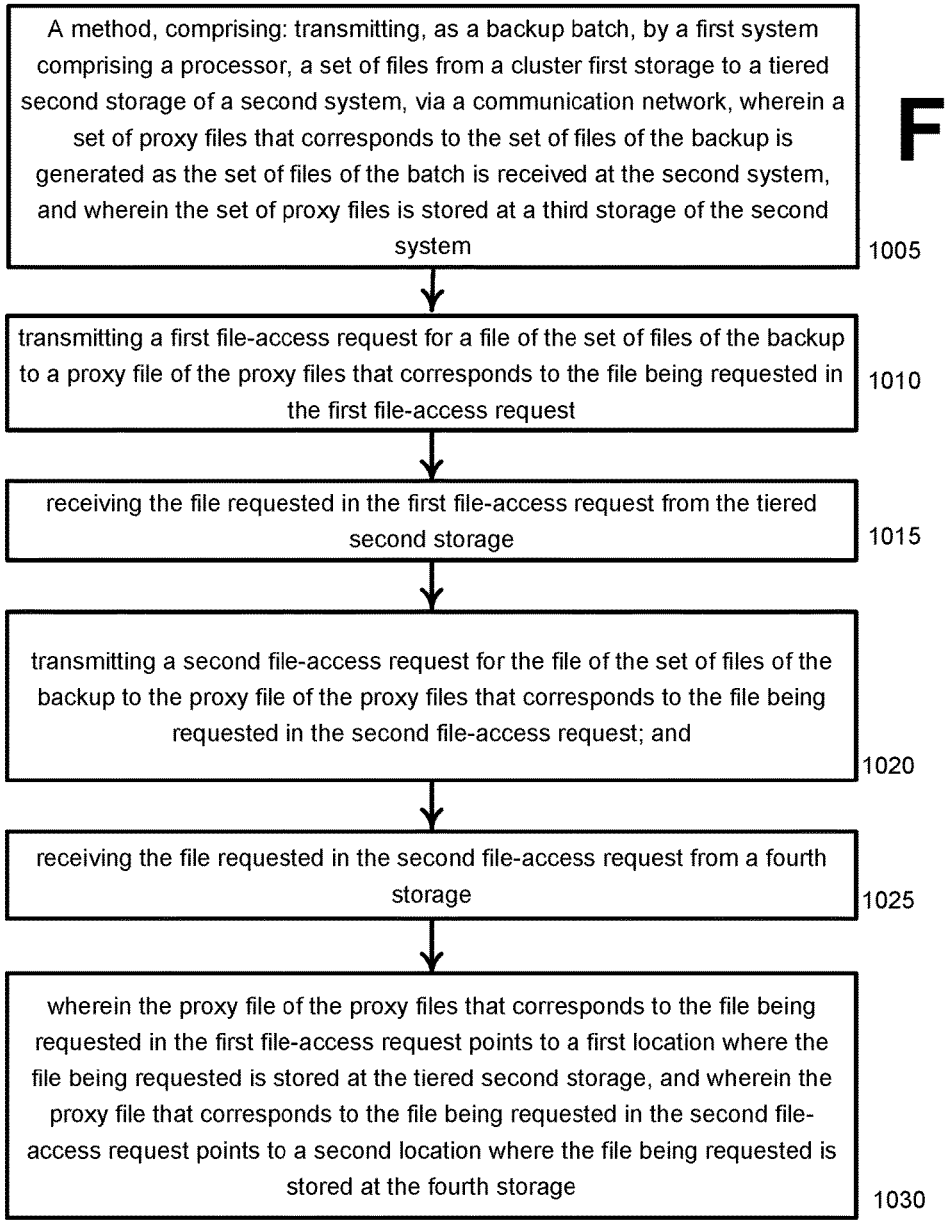
FIG. 10 illustrates a block diagram of another example method to recover files from a backup.

Turning now to FIG. 10, the figure illustrates an exemplary embodiment method 1000 comprising at block 1005 transmitting, as a backup batch, by a first system comprising a processor, a set of files from a cluster first storage to a tiered second storage of a second system, via a communication network, wherein a set of proxy files that corresponds to the set of files of the backup is generated as the set of files of the batch is received at the second system, and wherein the set of proxy files is stored at a third storage of the second system; at block 1010 transmitting a first file-access request for a file of the set of files of the backup to a proxy file of the proxy files that corresponds to the file being requested in the first file-access request; at block 1015 receiving the file requested in the first file-access request from the tiered second storage; at block 1020 transmitting a second file-access request for the file of the set of files of the backup to the proxy file of the proxy files that corresponds to the file being requested in the second file-access request; and at block 1025 receiving the file requested in the second file-access request from a fourth storage. At block 1030 the proxy file of the proxy files that corresponds to the file being requested in the first file-access request points to a first location where the file being requested is stored at the tiered second storage, and the proxy file that corresponds to the file being requested in the second file-access request points to a second location where the file being requested is stored at the fourth storage.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by a system comprising a processor, one or more files from a cluster first storage;
   storing the one or more files to a tiered second storage as a backup;
   generating one or more proxy files that correspond to the one or more files of the backup;
   receiving a first file-access request for a file of the one or more files of the backup;
   based on first information contained in a proxy file of the one or more proxy files, retrieving the file requested in the first file-access request from the tiered second storage;
   providing, from the proxy file, second information contained in the corresponding one or more files of the backup during the retrieving of the file requested in the first file-access request; and
   providing the file requested in the first file-access request in response to the first file-access request.

2. The method of claim 1, wherein the one or more files of the backup are received in a batch.

3. The method of claim 1, further comprising:
   copying the file requested in the first file-access request to a cluster third storage; and
   providing the file requested in the first file-access request from the cluster third storage in response to a second file-access request that requests the file requested in the first file-access request.

4. The method of claim 1, wherein the one or more proxy files comprise third information corresponding to locations where the one or more files of the backup are stored.

5. The method of claim 1, further comprising storing the one or more proxy files that correspond to the one or more files of the backup to the tiered second storage.

6. The method of claim 5, wherein the one or more proxy files are stored on a standby storage.

7. The method of claim 5, wherein the one or more proxy files are generated as the one or more files are received from the high-performance first storage.

8. The method of claim 1, wherein the providing of the file in response to the first file-access request occurs during a re-storing of the one or more files of the backup to a cluster storage.

9. A system, comprising:
   a processor configured to:
      receive a group of files from a cluster first storage for storage as a backup on a tiered second storage;
      store the group of files to the tiered second storage as the backup;
      generate a group of proxy files that corresponds to the group of files of the backup;
      receive a first file-access request for a file of the group of files of the backup;
      based on first information contained in a proxy file, of the group of proxy files, corresponding to the file requested in the first file-access request, retrieve the file requested in the first file-access request from the tiered second storage;
      provide, from the proxy file, second information contained in the file requested in the first file-access request during the retrieving of the file requested in the first file-access request, and
      enable access to the file requested in the first file-access request in response to the first file-access request.

10. The system of claim 9, wherein the group of files to be stored as the backup are received as part of a batch file transfer process.

11. The system of claim 9, wherein the processor is further configured to:
    copy the file requested in the first file-access request to a cluster third storage; and
    provide the file requested in the first file-access request from the high-performance third storage in response to a second file-access request that requests the file requested in the first file-access request.

12. The system of claim 9, wherein the group of proxy files comprises third information corresponding to locations on the tiered second storage where the group of files of the backup is stored.

13. The system of claim 9, wherein the processor is further configured to store the group of proxy files that corresponds to the group of files of the backup as links on the tiered second storage.

14. The system of claim 13, wherein the group of proxy files is stored on a standby storage.

15. The system of claim 9, wherein the group of proxy files is generated as the group of files is received from the cluster first storage.

16. The system of claim 9, wherein the enabling the access to the file in response to the first file-access request occurs during a re-storing of the group of files of the backup to a cluster storage.

17. A method, comprising:
    transmitting, as a backup batch, by a first system comprising a processor, a set of files from a cluster first storage to a tiered second storage of a second system, via a communication network, wherein a set of proxy files that corresponds to the set of files of the backup is generated as the set of files of the batch is received at the second system, and wherein the set of proxy files is stored at a third storage of the second system;
    transmitting a first file-access request for a file of the set of files of the backup to a proxy file of the proxy files that corresponds to the file being requested in the first file-access request;

receiving the file requested in the first file-access request from the tiered second storage;

transmitting a second file-access request for the file of the set of files of the backup to the proxy file of the proxy files that corresponds to the file being requested in the second file-access request; and receiving the file requested in the second file-access request from a fourth storage;

wherein information contained in the file being requested in the first file-access request is provided from the proxy file before the receiving of the file requested in the second file-access request from the fourth storage.

18. The method of claim 17, wherein the tiered second storage comprises the third storage.

19. The method of claim 17, wherein the set of proxy files comprises pointers that point to respective files of the set of files of the backup at the tiered second storage.

20. The method of claim 17, wherein the proxy file of the proxy files that corresponds to the file being requested in the first file-access request points to a first location where the file being requested is stored at the tiered second storage, and wherein the proxy file that corresponds to the file being requested in the second file-access request points to a second location where the file being requested is stored at the fourth storage.

* * * * *